(12) United States Patent
Kim

(10) Patent No.: US 6,559,887 B1
(45) Date of Patent: May 6, 2003

(54) METHOD AND APPARATUS FOR TRANSMITTING AND RECORDING SIGNALS OF A STILL IMAGE USING INDEX SIGNALS

(75) Inventor: Yong Ho Kim, Kwangmyung (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 0 days.

(21) Appl. No.: 09/163,369

(22) Filed: Sep. 30, 1998

(30) Foreign Application Priority Data

Sep. 30, 1997 (KR) .......................... P97-50590

(51) Int. Cl.⁷ .................. H04N 5/76; H04N 5/232
(52) U.S. Cl. ................ 348/231.3; 348/211.2; 348/211.5; 358/909.1
(58) Field of Search .................. 358/906, 909.1; 360/32, 46, 48; 386/29, 38, 46, 64, 95, 96, 104, 107, 109, 112, 120; 348/207, 222, 231, 232, 233, 460, 461, 465, 467, 468; H04N 5/76, 7/00

(56) References Cited

U.S. PATENT DOCUMENTS

| | | | | |
|---|---|---|---|---|
| 3,984,625 A | * | 10/1976 | Camras | 348/158 |
| 4,739,417 A | * | 4/1988 | Ogawa | 358/906 |
| 5,055,937 A | * | 10/1991 | Yamada | 386/64 |
| 5,513,010 A | * | 4/1996 | Kori | 386/104 |
| 5,596,419 A | * | 1/1997 | Yoshimura | 386/52 |
| 5,699,370 A | * | 12/1997 | Kaniwa | 386/109 |
| 5,724,474 A | * | 3/1998 | Oguro | 386/95 |
| 5,748,238 A | * | 5/1998 | Wakabayashi | 348/373 |
| 6,009,233 A | * | 12/1999 | Tsujimura | 386/95 |

* cited by examiner

Primary Examiner—Ngoc-Yen Vu
(74) Attorney, Agent, or Firm—Sughrue Mion, PLLC

(57) ABSTRACT

A method for transmitting image pickup signals and an apparatus therefor are disclosed. Image pickup signals of an object photographed by means of a digital still camera (digital electronic still camera) are transmitted to an image recording apparatus such as video cassette tape recorder or a video camera to be recorded there. That is, the digital electronic still camera is provided with an infrared ray transmitting section, and The image recording apparatus is provided with an infrared ray receiving section. When the digital electronic still camera reproduces the stored images to transmit them to the image recording apparatus, certain control signals are transmitted both to the infrared ray transmitting section and to the infrared ray receiving section. In accordance with the received control signals, the image recording apparatus is put to a momentary stop mode and then to a recording mode to record the images from the digital electronic still camera. Under this condition, when the digital electronic still camera outputs the control signals, index insertion control signals are accompanied. The image recording apparatus carries out the recording by inserting index signals in accordance with the received index insertion control signals. Therefore, the user can accurately record the image signals in the image recording apparatus by exactly matching the timing without manipulating the image recording apparatus. Further, a particular scene can be speedily found from the recorded images by utilizing the index signals.

5 Claims, 4 Drawing Sheets

METHOD AND APPARATUS FOR TRANSMITTING AND RECORDING SIGNALS OF A STILL IMAGE USING INDEX SIGNALS

BACKGROUND OF THE INVENTION

1. Field of the Invention

The present invention relates to a method for transmitting image pickup signals and an apparatus therefor, in which image pickup signals of an object photographed by means of a digital still camera (digital electronic still camera) are transmitted to an image recording apparatus such as video cassette tape recorder or a video camera to be recorded there.

2. Description of the Prior Art

Generally a digital electronic still camera convert image signals to electrical signals, and electrically carries out processing, recording and reproduction for the signals.

Unlike the conventional camera using the silver salt film, the digital electronic still camera requires no dark room development processing and no chemical treatment. Further, it is capable of confirming the picked-up image immediately, and the recorded image information is stored in an electronic form. Therefore, a computer can carry out a finish processing for the information, and a long distance transmission is possible.

For example, the information can be connected to the internet to form a home page by using the pictures which have been photographed by means of the digital still camera. Further, various reports can be prepared by inserting the picked-up images. Further, an electronic album can be formed by inserting graduation photographs or marriage photographs, or the photographs can be stored in a diskette.

Generally, this digital still camera is available in a VGA (640 ×480) scale, and has a large capacity memory so that a large number of photographs can be recorded.

FIG. 1 is a block diagram showing the constitution of the conventional digital electronic still camera.

As shown in FIG. 1, the conventional digital still camera includes: a control section 1 for controlling various functions such as image-picking-up for objects, converting the picked-up images into electrical signals, recording and reproduction; a key inputting section 2 for inputting user's commands into the control section 1; a CCD (charge coupled device) 4 for image-picking-up for objects through a lens 3 to convert the picked-up images into electrical signals; a timing generator 5 for adjusting the image output after its photographing by the CCD 4 in accordance with the control section 1; a CDS/AGC (correlated double sampling/automatic gain control) 6 for adjusting the gain of the output signals of the CCD 4, and for removing noises; an analogue/digital converter 7 for converting the output signals of the CDS/AGC 6 into digital signals; a temporary memory 8 for temporarily storing the reproduction signals and the output signals of the analogue/digital converter 7 under the control of the control section 1; a compressedly-storing memory 9 for storing and outputting the picked-up image signals under the control of the control section 1; a JPEG (joint photographic coding experts group) processor 10 for compressing the image signals of the temporary memory 8 into the JPEG form, and for expanding them under the control of the control section 1; and an encoder 11 for converting the expanded image signals of the JPEG processor 10 into television signals under the control of the control section 1.

The temporary memory generally consists of DRAM (direct random access memory), while the compressedly-storing memory 9 consists of a flash memory.

When an object is photographed by using the above described conventional digital still camera, the user presses the shutter key of the key inputting section 2 while confirming the object through a view finder (not illustrated).

Then the control section 1 judges on the pressing of the shutter key, and controls the timing generator 5 to drive the CCD 4.

The CCD 4 picks up the image of the object through the lens 3, and then, converts the picked-up image into electrical signals under the control of the timing generator 5.

For the output signals of the CCD 4, the gain is adjusted, and noises are removed by the CDS/AGC 6 under the control of the control section 1. Then the signals are converted into digital signals by the analogue/digital converter 7 to be stored into the temporary memory 8.

The picked-up images of the temporary memory 8 are inputted into the JPEG processor 10 under the control of the control section 1 to be compressed into the JPEG form so as to be sequentially stored into the compressedly-storing memory 9.

That is, in the digital electronic still camera, when the shutter key of the key inputting section 2 is pressed, the image of the object which has been photographed by the CCD 4 is converted into electrical signals. Then the electrical signals are converted into digital signals, and then, the digital signals are compressed into the JPEG form to be sequentially stored into the compressedly-storing memory 9. This procedure is repeatedly carried out.

The picked-up image signals which have been stored in the compressedly-storing memory 9 can be outputted to be recorded into an image recording apparatus such as video cassette tape recorder or video camera. Or in the case where the signals are displayed on a display device such as a monitor or a television, the control section 1 reads the compressedly stored image signals one by one from the compressedly-storing memory 9. Then the signals are inputted into the JPEG processor 10 to restore the signals into the original picked-up image signals.

When the restoration is completed, the restored signals are inputted into the encoder 11, so that the encoder would convert the signals into television signals.

Then the converted signals are displayed on a display device, or recorded in a image recording apparatus.

However, in the above described conventional digital still camera, when the picked-up images are recorded into an image recording apparatus, the digital electronic still camera reproduces the images, and the reproduced image signals are transmitted through a connecting jack or the like to the image recording apparatus. During this process, the image recording apparatus has to be put to the recording stop mode.

That is, when the images which are being reproduced by the digital electronic still camera are recorded into an image recording apparatus, first the image recording apparatus has to be momentarily put to a stopped status.

Then while operating the digital electronic still camera under a reproduction mode, the image recording apparatus has to be put to a recording mode.

Therefore, the operating procedure is very complicated and troublesome, and it is very difficult to adjust an exact timing. Therefore, the quality of the recorded images are liable to be degraded.

Further, the images to be recorded are simply supplied from the digital electronic still camera through the jack to the image recording apparatus. Therefore, in the case where the user wants to find out a particular scene from the images, the user has to check one scene by one scene by displaying the images on a display device such as a monitor or a television. This is very troublesome to the user, and much time is consumed.

SUMMARY OF THE INVENTION

The present invention is intended to overcome the above described disadvantages of the conventional technique.

Therefore it is an object of the present invention to provide a method for transmitting image pickup signals and an apparatus therefor, in which when the stored images of the digital electronic still camera are to be reproduced, the image recording apparatus is automatically controlled, so that the reproduced images can be recorded.

It is another object of the present invention to provide a method for transmitting image pickup signals and an apparatus therefor, in which a particular position of the recorded images of the image recording apparatus can be speedily found.

In achieving the above objects, the present invention is characterized as follows. That is, the digital electronic still camera is provided with an infrared ray transmitting section, and the image recording apparatus is provided with an infrared ray receiving section.

When the digital electronic still camera reproduces the stored images to transmit them to the image recording apparatus, certain control signals are transmitted both to the infrared ray transmitting section and to the infrared ray receiving section.

In accordance with the received control signals, the image recording apparatus is put to a momentary stop mode and then to a recording mode to record the images from the digital electronic still camera.

Under this condition, when the digital electronic still camera outputs the control signals, index insertion control signals are accompanied. The image recording apparatus carries out the recording by inserting index signals in accordance with the received index insertion control signals.

Therefore, in the present invention, the user can accurately record the image signals in the image recording apparatus by exactly matching the timing without manipulating the image recording apparatus. Further, a particular scene can be speedily found from the recorded images by utilizing the index signals.

BRIEF DESCRIPTION OF THE DRAWINGS

The above objects and other advantages of the present invention will become more apparent by describing in detail the preferred embodiment of the present invention with reference to the attached drawings in which.

DETAILED DESCRIPTION OF THE PREFERRED EMBODIMENT

The method and apparatus of the present invention will be described referring to FIGS. 2 to 4.

Figure 1:
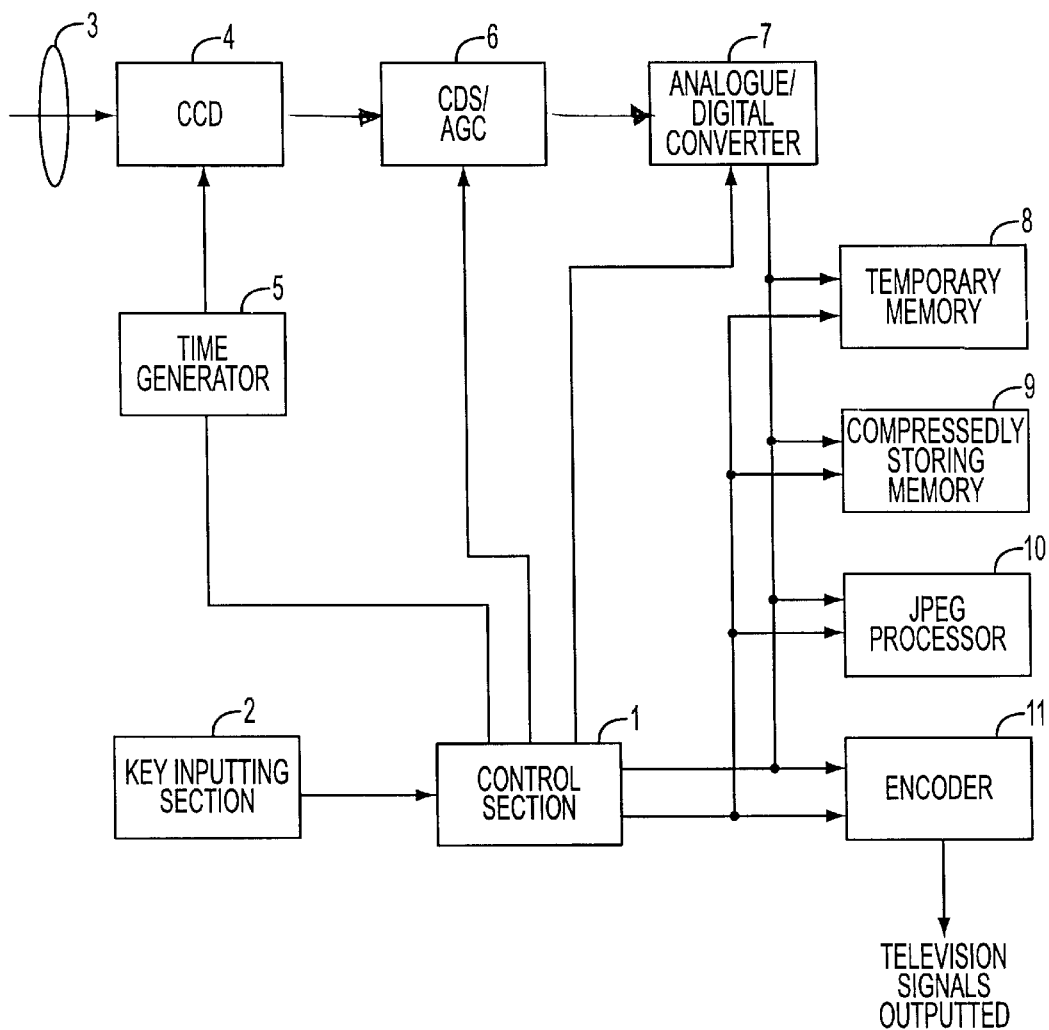
FIG. 1 is a block diagram showing the constitution of the conventional digital electronic still camera.
Figure 2:
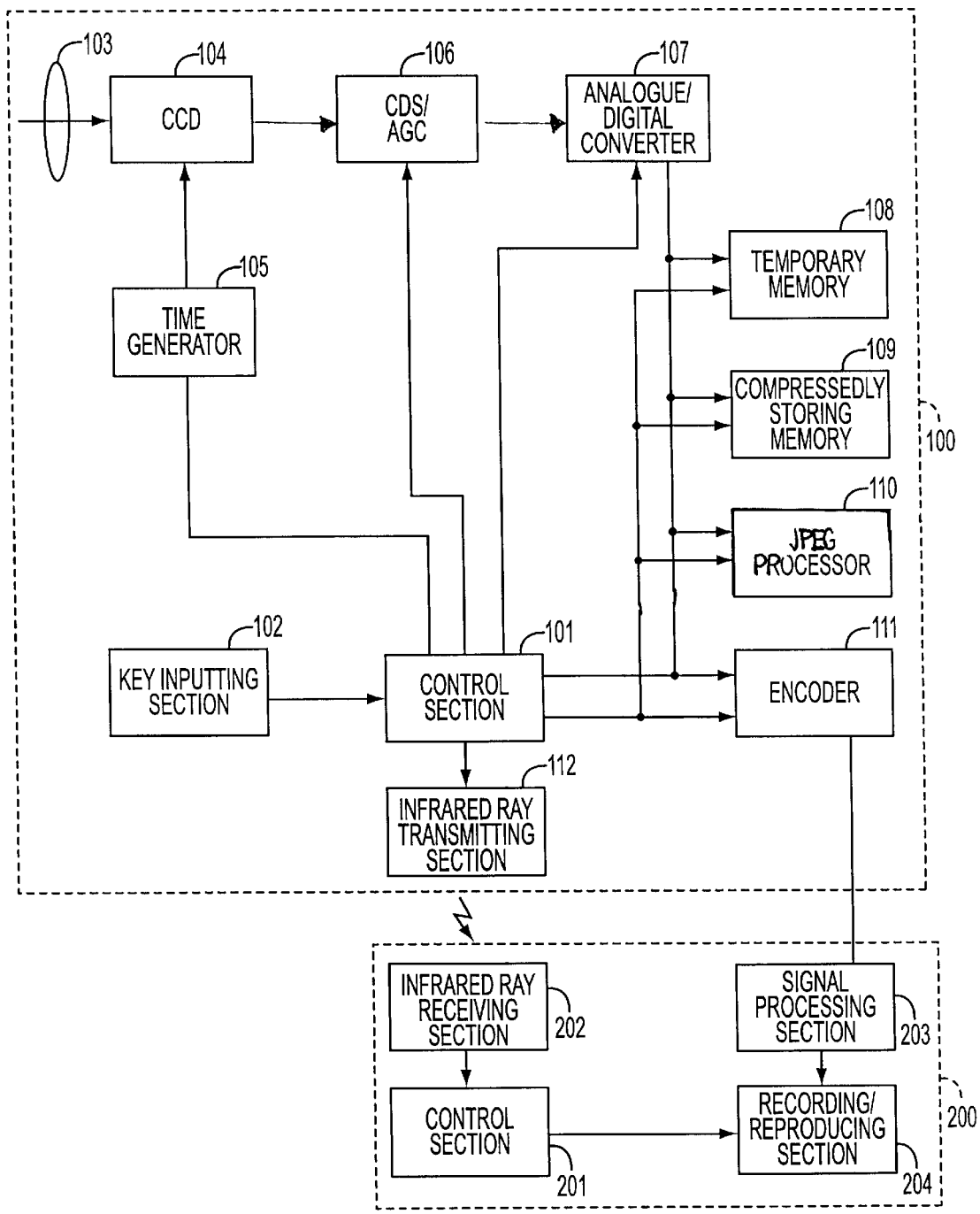
FIG. 2 is a block diagram showing the constitution of the digital electronic still camera according to the present invention.

FIG. 2 is a block diagram showing the constitution of the digital electronic still camera according to the present invention.

In this drawing, reference code 100 indicates a digital electronic still camera, and 200 indicates an image recording apparatus such as a video cassette tape recorder or a video camera.

As shown in FIG. 2, the digital electronic still camera 100 according to the present invention includes: a control section 101 for controlling various functions such as image-picking-up for objects, converting the picked-up images into electrical signals, recording and reproduction; a key inputting section 102 for inputting user's commands into the control section 101; a CCD 104 for image-picking-up for objects through a lens 103 to convert the picked-up images into electrical signals; a timing generator 105 for adjusting the image output after its photographing by the CCD 104 in accordance with the control section 101; a CDS/AGC 106 for adjusting the gain of the output signals of the CCD 104, and for removing noises; an analogue/digital converter 107 for converting the output signals of the CDS/AGC 106 into digital signals; a temporary memory 108 for temporarily storing the reproduction signals and the output signals of the analogue/digital converter 107 under the control of the control section 101; a compressedly-storing memory 109 for storing and outputting the picked-up image signals under the control of the control section 101; a JPEG processor 110 for compressing the image signals of the temporary memory 108 into a JPEG form, and foe expanding them under the control of the control section 101; an encoder converter 111 for converting the expanded image signals of the JPEG processor into television signals under the control of the control section 101; and an infrared ray transmitting section 112 for transmitting recording control signals, temporarily recording stopping signals, and index insertion control signals in a form of infrared rays to an image recording apparatus 200 under the control of the control section 101.

The image recording apparatus 200 includes: a control section 201 for controlling the recording and reproducing operations for inputted images; an infrared ray receiving section 202 for receiving the infrared rays from the infrared ray transmitting section 112 of the digital electronic still camera 100 to supply them to the control section 201; a signal processing section 203 for processing the television signals incoming from the encoder 111 of the digital electronic still camera 100; and a recording/reproducing section 204 for recording and reproducing the output signals of the signal processing section 203 under the control of the control section 201.

The infrared ray transmitting section 112 and the infrared ray receiving section 202 can be substituted by RF transmitting/receiving sections, or by wire transmitting/receiving sections.

Thus in the present invention, when an object is photographed, if a shutter key of the key inputting section 102 of the digital still camera 100 is pressed, the control section 101 recognizes the pressing to control the timing generator 105 so as to drive the CCD 104. The CCD 104 picks up the image of the object through the lens 103, and converts the picked-up images into electrical signals under the control of the timing generator 105.

Noises are removed from the output signals of the CCD 104, and their gains are adjusted by the CDS/AGC 106. Then the signals are converted into digital signals by the analogue/digital converter 107 to be stored into the temporary memory 108. The signals of the temporary memory 108 are inputted into the JPEG processor 110 under the control of the control section 101 to be compressed into a JPEG form so as to be stored into the compressedly-storing memory 109.

When the images of the compressedly-storing memory 109 are reproduced to be recorded into the magnetic recording apparatus 200, the control section 101 reads the required images of the compressedly-storing memory 109, so that the JPEG processor 110 can restore them to the original signals.

Upon completion of the restoration of the compressed images, the control section 101 transmits momentary recording stopping signals through the infrared ray transmitting section 112 to the image recording apparatus 200. The image recording apparatus 200 receives the momentary recording stopping signals through the infrared ray receiving section 202. Then the control section 201 puts the recording/reproducing section 204 to a temporary recording stop status in accordance with the received momentary recording stopping signals.

Then the control section 101 of the still camera outputs the restored images to the encoder 111 to convert them into television signals and to transmit them to the magnetic recording apparatus 200, while transmitting the index insertion control signals through the infrared ray transmitting section 112.

Then the magnetic recording apparatus 200 receives the index insertion control signals through the infrared ray receiving section 202.

Then the control section 201 controls the recording/reproducing section 204 in accordance with the received index insertion control signals to put the section 204 to a recording mode, thereby recording the images which have been received from the encoder 111 through the signal processing section 203.

Figure 3:
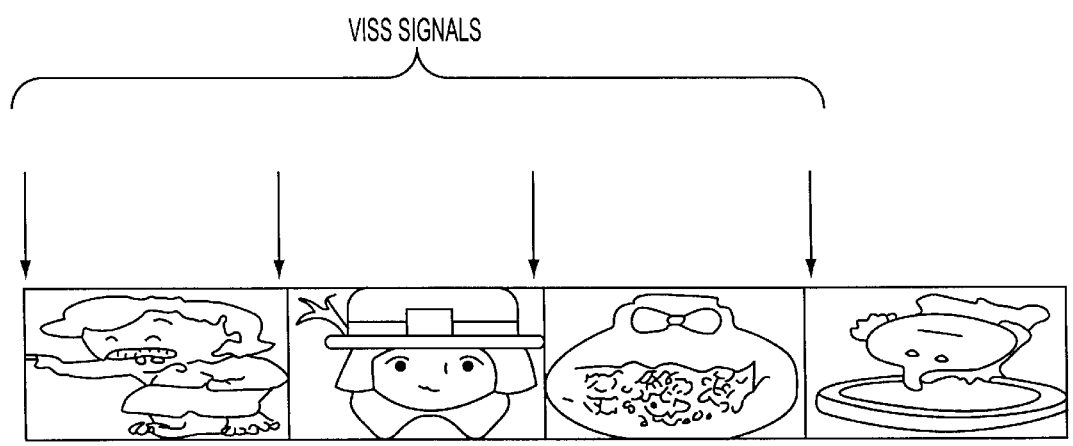
FIG. 3 illustrates the insertion of the index signals into the reproduced images of the digital electronic still camera according to the present invention.

That is, as shown in FIG. 3, after the insertion of a magnetic recording medium the magnetic recording apparatus records an index signal at the initial position of the image recording region.

Figure 4:
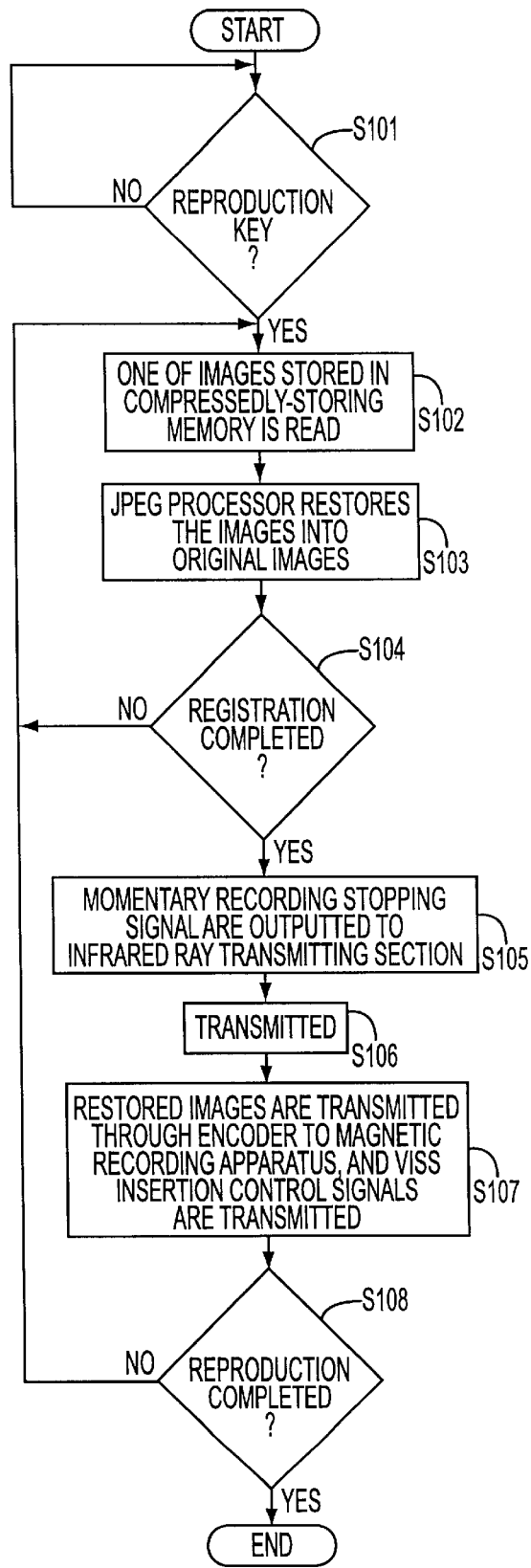
FIG. 4 is a flow chart showing the method of transmission according to the present invention.

FIG. 4 is a flow chart showing the method of transmission according to the present invention.

As shown in this drawing, a control section 101 of the digital electronic still camera 100 judges at a step S101 as to whether a reproduction key is inputted from a key inputting section 102.

If a reproduction key is inputted at the step S101, the control section 101 reads one of stored images from a compressedly-storing memory 109 at a step S102, and inputs the read image into a JPEG processor 110 to restore and store it at a step S103.

Then at a step S104, a judgment is made as to whether the image has been restored. If the restoration has been completed, momentary recording stopping signals are outputted to an infrared ray transmitting section 112 at a step S105, and the signals are transmitted to a magnetic recording apparatus 200 at a step S106.

Then the momentary recording stopping signals which have been transmitted from the infrared ray transmitting section 112 of the digital electronic still camera 100 are received to an infrared ray receiving section 202. Then in accordance with the received momentary recording stopping signals, a control section 201 executes a momentary recording stopping operation.

Then at a step S107, the restored images are converted to television signals by an encoder 111, and the converted signals are transmitted to a signal processing section 203 of the magnetic recording apparatus 200, while transmitting index insertion control signals through the infrared ray transmitting section 112.

The index insertion control signals are received by the infrared ray receiving section 202, and the control section 201 controls a recording/reproducing section 204 in accordance with the received index insertion control signals to release the momentary recording stopping operation. Thus an operation is executed under a recording mode, inserting the index signals at the same time, while executing an operation of recording the incoming television signals incoming through the signal processing section 203.

At a step S108, a Judgment is made as to whether the images of the compressedly-storing memory 109 are completely reproduced.

That is, the control section 101 judges as to whether all the images of the compressedly-storing memory 109 have been reproduced, and whether all of them have been outputted to the magnetic recording apparatus 200. If not, the system returns to the step S102 to repeat the operation of transmitting and recording the next images to the magnetic recording apparatus 200.

According to the present invention as described above, when the digital electronic still camera reproduces the picked-up images, and when the magnetic recording apparatus records them, the magnetic recording operation is automatically controlled. Therefore, the recording operation is carried out in a simple manner, and further, accurate timing matching is carried out, with the result that the quality of the recorded images is superior. Further the index signals are inserted, and therefore, the user can find out the wanted image in a speedy manner.

What is claimed is:

1. A method for transmitting image pickup signals, comprising the steps of:

receiving an original image in a digital still camera and compressedly storing the image;

restoring the stored compressed image to the original image;

converting the restored image to television signals after transmitting momentary recording stopping signals according to an automatic command of a controller of the digital still camera;

transmitting simultaneously the television signals and index insertion control signals;

using a magnetic recording apparatus to execute a momentary recording stop operation in accordance with the momentary recording stopping signals from said digital electronic still camera, and to insert the index signals into a recording medium in accordance with the index insertion control signals, and to simultaneously execute a television signal recording operation for recording the television signals.

2. An apparatus for transmitting image pickup signals, comprising:

a digital still camera which receives an original image of an object and compressedly stores the image, which restores the stored compressed image to the original image, converts the restored image to television signals after transmitting momentary recording stopping signals according to an automatic command of a controller of the digital still camera, and transmits simultaneously the television signals and index insertion control signals; and a magnetic recording apparatus which executes a momentary recording stop operation in accordance with the momentary recording stopping signals from said digital electronic still camera, inserts the index signals into a recording medium in accordance with the index insertion control signal, and simultaneously executes a television signal recording operation for recording the television signals.

3. The apparatus as claimed in claim 2, wherein said digital electronic still camera comprises a transmitting section for transmitting the momentary recording stopping signals and the index insertion control signals; and said magnetic recording apparatus comprises a receiving section for receiving the signals from said transmitting section.

4. The apparatus as claimed in claim 3, wherein signal transmissions between said transmitting section and said receiving section are done in a wire or wireless form.

5. The apparatus as claimed in claim 3, wherein under a wireless transmission, the signals are transmitted in a form of infrared rays or RF signals.

* * * * *